United States Patent [19]

Yamamoto et al.

[11] Patent Number: 5,335,933
[45] Date of Patent: * Aug. 9, 1994

[54] SUSPENSION SYSTEM OF A VEHICLE

[75] Inventors: Tadanobu Yamamoto; Hiroyoshi Kumada, both of Hiroshima, Japan

[73] Assignee: Mazda Motor Corporation, Hiroshima, Japan

[*] Notice: The portion of the term of this patent subsequent to Mar. 16, 2010 has been disclaimed.

[21] Appl. No.: 989,463

[22] Filed: Dec. 10, 1992

Related U.S. Application Data

[63] Continuation of Ser. No. 674,211, Mar. 25, 1991, abandoned.

[30] Foreign Application Priority Data

Mar. 30, 1990 [JP] Japan .................... 2-91382

[51] Int. Cl.⁵ .................................... B60G 3/20
[52] U.S. Cl. ................................ 280/675; 280/691
[58] Field of Search ................. 280/96.1, 660, 668, 280/691, 673, 675, 95.1, 846

[56] References Cited

U.S. PATENT DOCUMENTS

| | | | |
|---|---|---|---|
| 3,942,816 | 3/1976 | Scherenberg et al. | 280/673 |
| 4,440,420 | 4/1984 | Müller | 280/660 |
| 4,448,441 | 5/1984 | Brümmer et al. | 280/691 |
| 4,819,959 | 4/1989 | Inoue et al. | 280/660 |
| 4,978,131 | 12/1990 | Edahiro | 280/675 |
| 5,048,860 | 9/1991 | Kanai et al. | 280/660 |
| 5,193,843 | 3/1993 | Yamamoto et al. | 280/675 |

FOREIGN PATENT DOCUMENTS

| | | |
|---|---|---|
| 265959 | 5/1988 | European Pat. Off. . |
| 1938850 | 5/1970 | Fed. Rep. of Germany . |
| 1938851 | 8/1970 | Fed. Rep. of Germany . |
| 2255679 | 5/1974 | Fed. Rep. of Germany . |
| 3826930 | 3/1989 | Fed. Rep. of Germany . |
| 64-026507 | 2/1989 | Japan . |
| 6426507 | 2/1989 | Japan . |
| 2198997 | 6/1988 | United Kingdom . |

Primary Examiner—Mitchell J. Hill
Assistant Examiner—Paul Dickson
Attorney, Agent, or Firm—Keck, Mahin & Cate

[57] ABSTRACT

A suspension system for a vehicle includes a steering knuckle for supporting a wheel which is used for steering, an upper arm for connecting an upper portion of the steering knuckle to a frame of the vehicle, and a lower arm for connecting a lower portion of the steering knuckle to a frame of the vehicle. At least one of the arms has two link members, each of which is pivotally connected to the frame of the vehicle at one end thereof and to the steering knuckle at an opposite end thereof. The link members are disposed so as to set a kingpin offset at a positive value when a cross point between the kingpin axis and the ground is located inside of a center of a contact surface between the wheel and the ground in relation to a transverse direction of the vehicle, and to increase the kingpin offset as the wheel is turned toward an outward direction so that the wheel is located radially outwardly in relation to a turning circle.

3 Claims, 5 Drawing Sheets

SUSPENSION SYSTEM OF A VEHICLE

This is a continuation of application Ser. No. 07/674,211, filed Mar. 25, 1991, now abandoned.

BACKGROUND OF THE INVENTION

1. Field of the Invention

The present invention relates to a suspension system for anchoring wheels used for steering to a frame of a vehicle.

2. Description of the Prior Art

Hereinafter, a fore to aft direction of the vehicle is called a longitudinal direction, and a side to side direction of the vehicle is called a transverse direction. Also, a location near to a centerline of the vehicle is called an inside location and a location distant from a centerline of the vehicle is called an outside location.

There has been known a double pivot type suspension system for a vehicle. For example, Japanese Utility Model Laid-Open Publication No. 64-26507 shows such a type of suspension system. This type suspension system comprises a steering knuckle for supporting a wheel, and an upper arm and a lower arm respectively connecting an upper portion and a lower portion of the steering knuckle to a frame of a vehicle. At least one of the arms comprises two link members, each of which is pivotally connected to the frame at a respective one end thereof, and to the steering knuckle at a respective opposite end thereof.

In this type of suspension system, a kingpin axis, which is an axis around which a wheel used for steering is turned, extends through a cross point between the axis of the two link members. The kingpin axis moves in response to the movement of the cross point in a horizontal plane during steering of the vehicle. As a result, a kingpin offset, which is a transverse distance between the kingpin axis and a center of a contact surface between the wheel and the ground, varies as the kingpin axis moves.

SUMMARY OF THE INVENTION

It is, therefore, the object of the present invention to provide a double pivot type suspension system for a vehicle wherein the vehicle is stabilized against braking during turning by using the variation of the kingpin offset during steering of the vehicle.

In accordance with the present invention, there is provided a suspension system for a vehicle which comprises a steering knuckle for supporting a wheel which is used for steering, an upper arm for connecting an upper portion of the steering knuckle to a frame of the vehicle, and a lower arm for connecting a lower portion of the steering knuckle to the frame of the vehicle. At least one of the arms includes two link members, each of the link members being pivotally connected to the frame of the vehicle at one end thereof and to the steering knuckle at an opposite end thereof. The link members are disposed so as to set a kingpin offset at a positive value wherein a cross point between the kingpin axis and the ground is located inside of the center of a contact surface between the wheel and the ground in relation to a transverse direction of the vehicle, and increase the kingpin offset as the wheel is turned toward an outward direction in which the wheel is located radially outwardly in relation to a turning circle.

In the present invention, there is provided a suspension system for a vehicle which comprises a steering knuckle for supporting a wheel which is used for steering, an upper arm for connecting an upper portion of the steering knuckle to a frame of the vehicle, and a lower arm for connecting a lower portion of the steering knuckle to the frame of the vehicle. At least one of the arms includes two link members, each of the link members being pivotally connected to the frame of the vehicle at one end thereof and to the steering knuckle at an opposite end thereof. The link members are so disposed as to set a kingpin offset at a positive value wherein a cross point between the kingpin axis and the ground is located inside of the center of a contact surface between the wheel and the ground in relation to a transverse direction of the vehicle, and increase the kingpin offset as the wheel is turned toward an inward direction wherein the wheel is located radially inwardly in relation to a turning circle as well as an outward direction wherein the wheel is located radially outwardly in relation to the turning circle.

Also in the present invention, there is provided a suspension system for a vehicle which comprises a steering knuckle for supporting a wheel which is used for steering, an upper arm for connecting an upper portion of the steering knuckle to a frame of the vehicle, and a lower arm for connecting a lower portion of the steering knuckle to the frame of the vehicle. At least one of the arms including two link members and each of the link members is pivotally connected to the frame of the vehicle at one end thereof and to the steering knuckle at an opposite end thereof. The link members are so disposed as to set a kingpin offset at a positive value, wherein a cross point between the kingpin axis and the ground is located inside of the center of a contact surface between the wheel and the ground in relation to a transverse direction of the vehicle, and minimize the kingpin offset when the wheel is turned at a predetermined angle toward an inward direction, wherein the wheel is located radially inwardly in relation to a turning circle.

According to the features of the present invention, the two link members are so disposed as to set a kingpin offset at a positive value wherein a cross point between the kingpin axis and the ground is located inside of the center of a contact surface between the wheel and the ground in relation to a transverse direction of the vehicle, and increase the kingpin offset as the wheel is turned toward an outward direction, wherein the wheel is located radially outwardly in relation to a turning circle from the neutral position of the wheel. Thus, when the vehicle is braked during the turning of the same, a momentum due to a drag force working at the center of the contact surface between the wheel and the ground, which rotates the wheel being turned toward the outward direction opposite to the turning direction around the kingpin axis, increases as the wheel is turned to the turning direction, so that excessive turning of the vehicle is restricted, and the safety of the vehicle is enhanced.

The safety of the vehicle is much more enhanced if the two link members are so disposed as to set a kingpin offset at a positive value, wherein a cross point between the kingpin axis and the ground is located inside of the center of a contact surface between the wheel and the ground in relation to a transverse direction of the vehicle, and minimize the kingpin offset when the wheel is turned at a predetermined angle toward an inward direction, wherein the wheel is located radially inwardly in relation to a turning circle. In this case, as the kingpin offset is minimized when the wheel is turned toward an inward direction from a neutral position, the kingpin offset increases rapidly when the wheel is turned toward the outward direction from the neutral position, so that excessive turning of the vehicle is remarkably restricted, and the safety of the vehicle is still more enhanced.

The above and other objects and features of the present invention will become apparent from the following description of the preferred embodiments when considered in conjunction with the accompanying drawings.

DESCRIPTION OF THE PREFERRED EMBODIMENTS

Figure 1:
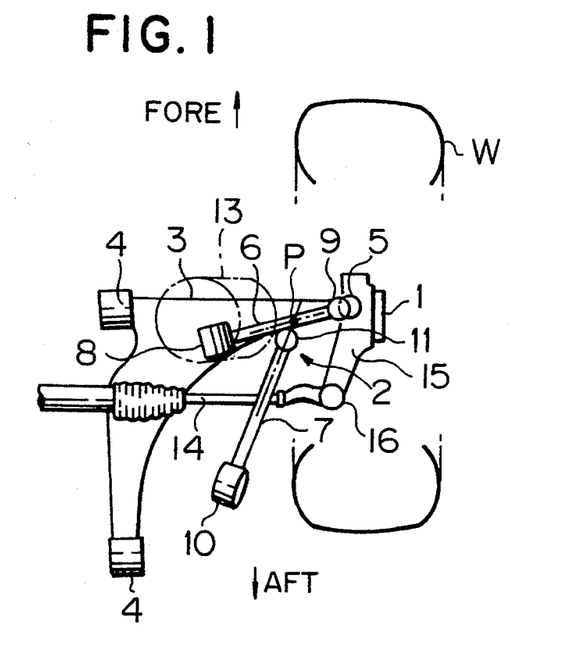
FIG. 1 is a plan view of a suspension system in accordance with a first embodiment of the present invention.
Figure 2:
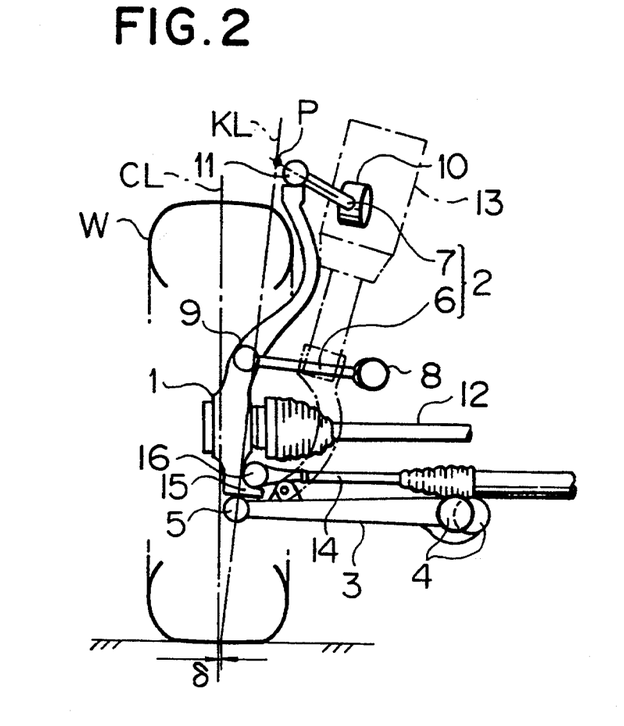
FIG. 2 is a front view of a suspension system in accordance with the first embodiment of the present invention.
Figure 3:
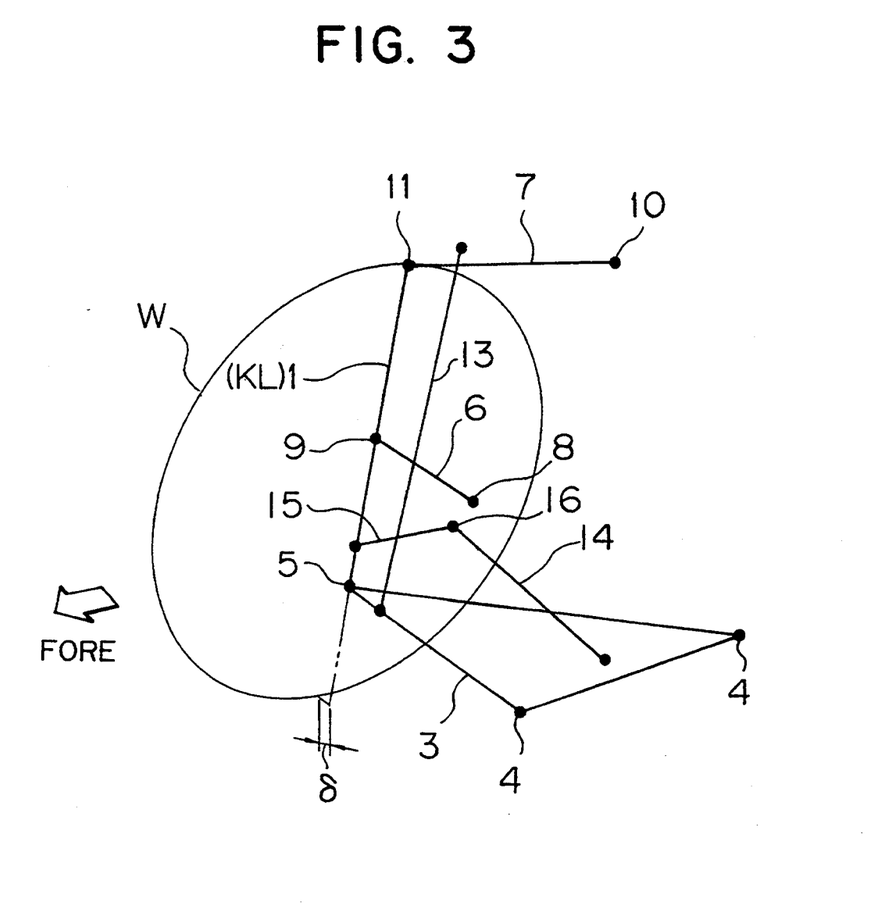
FIG. 3 is a schematic perspective view showing a general arrangement of the suspension system of the first embodiment of the present invention.

Referring to FIGS. 1 to 3, there is shown a suspension system according to a first embodiment of the present invention. The suspension system is for anchoring a right front wheel W, which is used for steering and also for driving, of a FF (front-engine-front-drive) vehicle, to the frame of the vehicle.

In FIGS. 1 to 3, a steering knuckle 1 supporting the wheel W is connected to and supported by the frame of the vehicle ( not shown) at an upper portion thereof through an upper arm 2, while being connected to and supported by the frame of the vehicle ( not shown) at a lower portion thereof through a lower arm 3. The lower arm 3 has an A shaped configuration. Two end points of the A shaped lower arm 3 are aligned in substantially a longitudinal direction of the vehicle, and respectively connected to and supported by the frame of the vehicle for vertical pivotal motion through rubber bushings 4, 4. The apex of the A shaped lower arm 3 is rotatably connected to the steering knuckle 1 through a ball joint 5.

The upper arm 2 comprises two link members 6, 7. The link member 6 is disposed in substantially a transverse direction of the vehicle. The link member 6 is connected to the frame of the vehicle through a rubber bush 8 at one end thereof and pivotally connected to the steering knuckle 1 through a ball joint 9 at an opposite end thereof. The link member 7 is disposed above the link member 6 and in substantially a longitudinal direction of the vehicle. The link member 7 is connected to the frame of the vehicle through a rubber bush 10 at one end thereof and pivotally connected to the steering knuckle 1 through a ball joint 11 at an opposite end thereof. As shown in FIG. 1, in a plan view, the link member 7 is disposed such that its axis, when extended, crosses an axis of the link member 6 at point P on the axis of the link member 7. Moreover, the link member 7 is located to the rear of the cross point P in relation to the longitudinal direction of the vehicle. Though not shown in FIG. 1, the rubber bushes 8, 10 respectively comprise an inner cylinder, an outer cylinder and a rubber placed into a space between the two cylinders. Thus, the link members 6, 7 can pivot horizontally within a limited angle determined by the resiliency of the rubber bushes 8, 10, and they can rotate around the axes of the rubber bushes 8, 10 to pivot upward and downward. In FIG. 2, there is also shown a drive shaft 12 and a shock absorber 13. The shock absorber 13 is connected to the lower arm 3 at a lower end thereof and to the frame of the vehicle at an upper end thereof. A tie rod 14 of the steering system is connected to a steering arm 15 protruding from the steering knuckle 1 through a ball joint 16. Thus, under a steering force provided through the tie rod 14, the front wheel W, integrally with the steering knuckle 1, turns around a kingpin axis KL.

The kingpin axis KL extends from a cross point between the lower arm 3 and the steering knuckle 1, ie., the center of the ball joint 5, to the point P on the axis of the link member 7 where, in a plan view, the axis of the link member 6 and the axis of the link member 7 cross each other. A kingpin offset $\delta$, which is the transverse distance between the kingpin axis KL and the center of a contact surface between the front wheel W and the ground, ie., a cross point between a center line CL of the front wheel W and the ground, is set at a positive value, that is a cross point between the kingpin axis KL and the ground is located inside of the cross point between the center line CL of the front wheel W and the ground in relation to the transverse direction of the vehicle. The kingpin offset $\delta$ varies as the cross point P moves in response to the turning of the front wheel W.

Figure 4:
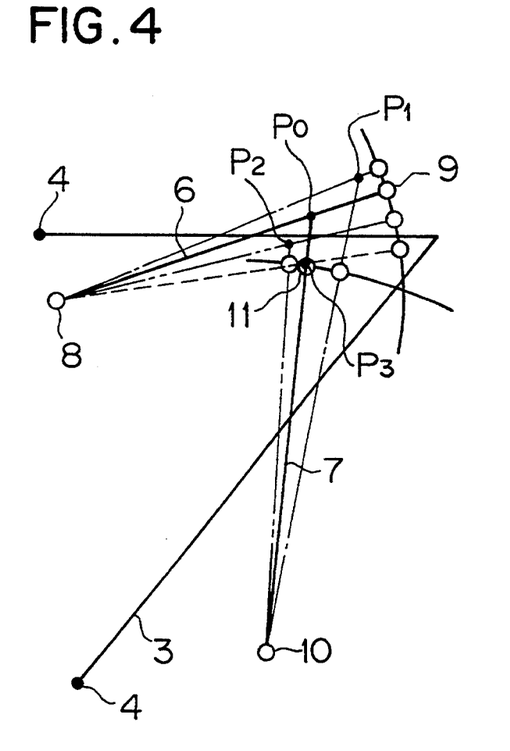
FIG. 4 is a schematic plan view of the arrangement of FIG. 3.

The movement of the cross point P in response to the turning of the front wheel W will be described hereinafter with reference to FIG. 4. In FIG. 4, the link members 6, 7 are indicated by solid lines when the front wheel W is in the neutral position, by dashed lines when the front wheel W is turned in a direction in which the wheel W is positioned radially outwardly in relation to a turning circle of the vehicle, that is in which the front wheel W is turned so as to turn the vehicle to the left in this embodiment. Hereinafter, this direction is called an outward direction. The link members 6 and 7 are indicated by two-dot chain lines when the front wheel W is turned in a direction in which the wheel W is positioned radially inwardly in relation to a turning circle of the vehicle, that is in which the front wheel W is turned so as to turn the vehicle to the right in this embodiment. Hereinafter, this direction is called an inward direction. The link members are further indicated by broken lines when the front wheel W is excessively turned to the inward direction.

As is understood from FIG. 4, the link members 6, 7 of the upper arm 2 horizontally pivot around their respective connection points to the frame of the vehicle, ie., the rubber bushes 8, 10, in response to the turning of the front wheel W. Thus the cross point P between the link members 6 and 7 moves along the axis of the link member 6. More specifically, when the front wheel W is turned to the outward direction from the neutral position, the cross point P moves to the outside of the vehicle along the link member 6 ($P_0$ to $P_1$). When the front wheel W is turned to the inward direction from the neutral position, the cross point P moves to the inside of the vehicle along the link member 6 ($P_0$ to $P_2$). But this movement of the cross point P to the inside of the vehicle ceases when the cross point P overlaps the connection point of the link member 7 with the steering knuckle 1, ie., the ball joint 11. When the front wheel W is still further turned to the inward direction, the cross point P moves to the outside along the link member 6 ($P_2$ to $P_3$). Thus, the kingpin offset $\delta$, as denoted by a line A in FIG. 1, is within a positive value wherein the cross point between the kingpin axis KL and the ground lies inside of the cross point between the centerline CL of the front wheel W and the ground in relation to the transverse direction of the vehicle. The kingpin offset $\delta$ becomes a minimum when the front wheel W is turned to the inward direction to such an extent that the cross point P overlaps the connection point of the link member 7 with the steering knuckle 1, ie., the ball joint 11. When the front wheel W is still further turned to the inward direction, or when the front wheel W is turned to the outward direction, the kingpin offset $\delta$ increases substantially along a quadratic curve.

As described above, link members 6, 7 are so disposed as to set the kingpin offset $\delta$ at a positive value and increase the kingpin offset $\delta$ when the front wheel W is turned to the outward direction from the neutral position. Thus, when the vehicle is braked during the turning of the same, a momentum, due to a drag force working on the center of the contact surface between the front wheel W and the ground, which rotates the front wheel W being turned to the outward direction opposite to the turning direction around the kingpin axis KL, increases as the front wheel W is turned to the turning direction, so that excessive turning of the vehicle is restricted when it is braked during the turning of the same, and the safety of the vehicle is enhanced.

In this embodiment, as the kingpin offset $\delta$ is minimized when the front wheel W is turned to the inward direction from the neutral position, the kingpin offset $\delta$ increases rapidly when the front wheel W is turned to the outward direction from the neutral position, so that excessive turning of the vehicle is remarkably restricted, and the safety of the vehicle is still more enhanced.

Figure 6:
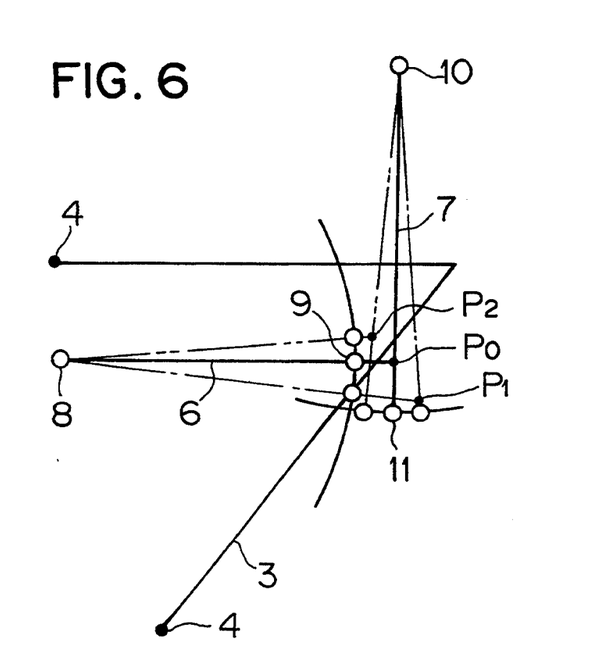
FIG. 6 is a schematic plan view of a general arrangement of a suspension system of a second embodiment of the present invention.

FIG. 6 shows a second embodiment of the present invention. In this embodiment, the link member 6 is disposed transversely, and the link member 7 is disposed longitudinally. As shown in FIG. 6, in a plan view, the link member 6 is disposed such that its axis, when extended to the outside, crosses an axis of the link member 7 at point P on the axis of the link member 7. Moreover, the link member 7 is located in front of the cross point P in relation to the longitudinal direction of the vehicle.

When the front wheel W is turned from the neutral position to the outward direction, the cross point P moves along the axis of the link member 7. The link member 7 pivots to the outside of the vehicle around the connection point thereof with the frame of the vehicle, ie., the rubber bush 10, when the front wheel W is turned from the neutral position to the outward direction, and pivots to the inside of the vehicle when the front wheel W is turned from the neutral position to the inward direction. Thus, the cross point P moves to the outside of the vehicle when the front wheel W is turned from the neutral position to the outward direction ($P_0$ to $P_1$), while it moves to the inside of the vehicle when the front wheel W is turned from the neutral position to the inward direction ($P_0$ to $P_2$). However, if the front wheel W is turned to the inward direction so as to exceed the position where the cross point P overlaps the connection point of the link member 6 with the steering knuckle 1, ie., the ball joint 9, the cross point P moves to the outside.

Figure 5:
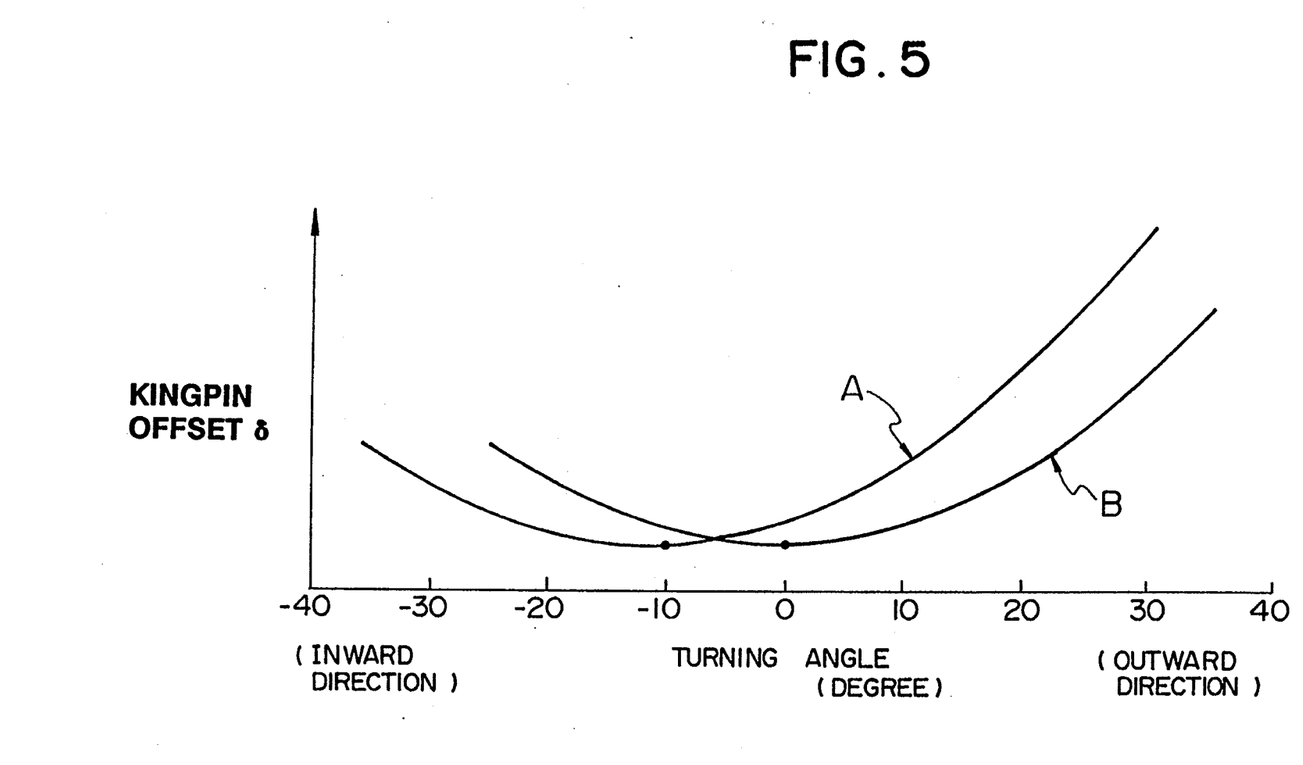
FIG. 5 is a diagram showing variations in a kingpin offset.

As a result, as in the first embodiment, the kingpin offset $\delta$, as denoted by a line A in FIG. 5, is within a positive value wherein the cross point between the kingpin axis KL and the ground lies inside of the cross point between the centerline CL of the front wheel W and the ground in relation to the transverse direction of the vehicle. The kingpin offset $\delta$ is minimized when the front wheel W is turned to the inward direction to such an extent that the cross point P overlaps the connection point of the link member 6 with the steering knuckle 1, ie., the ball joint 9. When the front wheel W is still further turned to the inward direction, or when the front wheel W is turned to the outward direction, the kingpin offset $\delta$ increases substantially along a quadratic curve. Thus, excessive turning of the vehicle is restricted when it is braked during the turning of the same, and the safety of the vehicle is enhanced.

Figure 7:
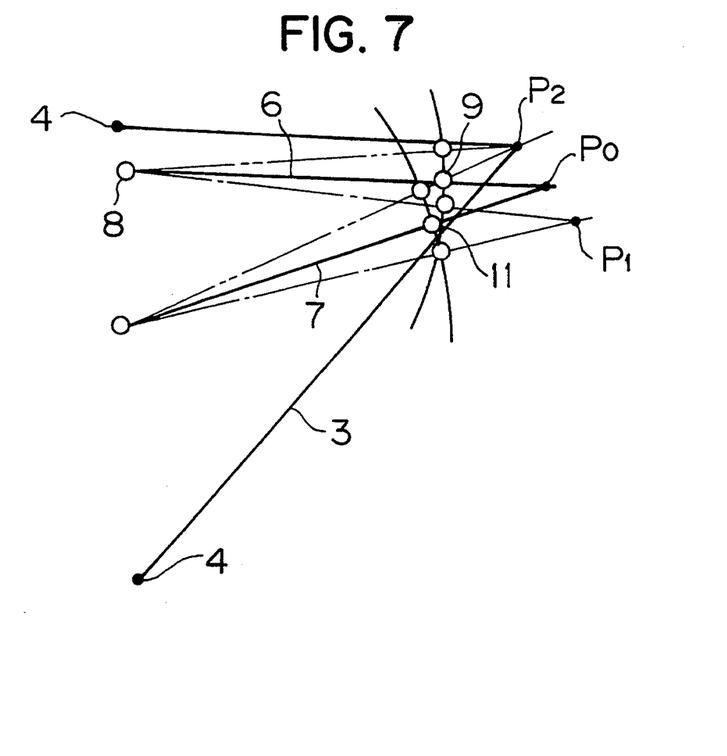
FIG. 7 is a schematic plan view of a general arrangement of a suspension system of a third embodiment of the present invention.

FIG. 7 shows a third embodiment of the present invention. In this embodiment, the link member 6 is disposed transversely, and the link member 7 is disposed longitudinally and obliquely. As shown in FIG. 7, in a plan view, the link members 6 and 7 are disposed such that their axes, when extended to the outside of the vehicle, cross each other. Moreover, the link member 7 is located to the rear of the cross point P in relation to the longitudinal direction of the vehicle.

Thus, the cross point P moves to the outside of the vehicle when the front wheel W is turned form the neutral position to the outward direction ($P_0$ to $P_1$), while it moves to the inside of the vehicle when the front wheel W is turned from the neutral position to the inward direction ($P_0$ to $P_2$). However, if the front wheel W is turned to the inward direction so as to exceed the position where the cross point P overlaps the connection point of the link member 6 with the steering knuckle 1, ie., the ball joint 9, the cross point P moves to the outside.

As a result, as int he first embodiment, the kingpin offset $\delta$, as denoted by a line A in FIG. 5, is within a positive value wherein the cross point between the kingpin axis KL and the ground lies inside of the cross point between the centerline CL of the front wheel W and the ground in relation to the transverse direction of the vehicle. The kingpin offset $\delta$ is minimized when the front wheel W is turned to the inward direction to such an extent that the cross point P overlaps the connection point of the link member 6 with the steering knuckle 1, ie., the ball joint 9. When the front wheel W is turned to the outward direction, the kingpin offset $\delta$ increases substantially along a quadratic curve.

Figure 8:
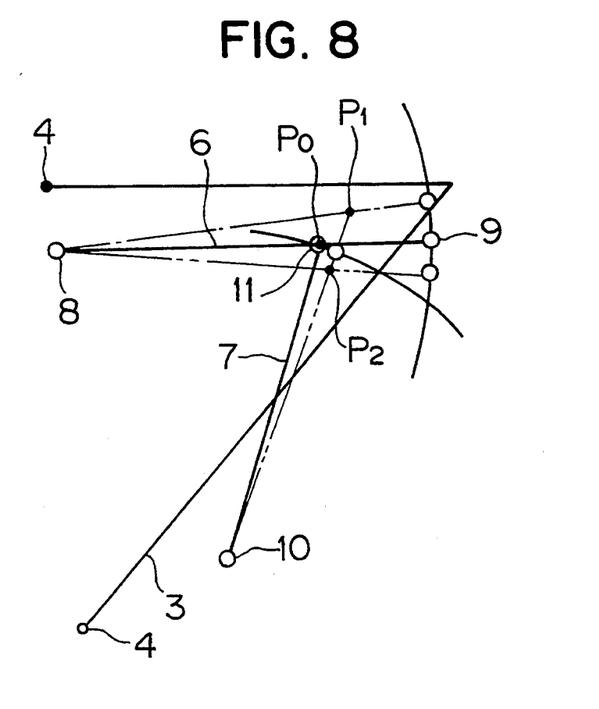
FIG. 8 is a schematic plan view of a general arrangement of a suspension system of a fourth embodiment of the present invention.

FIG. 8 shows a fourth embodiment of the present invention. In this embodiment, the disposition of the link members 6 ad 7 is almost the same as in the first embodiment. However, in this embodiment, when the front wheel W is in the neutral position, the connection point of the link member 7 with the steering knuckle 1, ie., the ball joint 11, is located on the axis of the link member 6 in a plan view. In other words, the cross point P is located on the axis of the link member 7 in a plan view when the front wheel W is in the neutral position.

Thus, the cross point P moves to the outside of the vehicle when the front wheel W is turned from the neutral position to the outward direction ( $P_0$ to $P_1$ ). Also, the cross point P moves to the outside of the vehicle when the front wheel W is turned from the neutral position to the inward direction ( $P_0$ to $P_2$ ).

As a result, the kingpin offset $\delta$, as denoted by a line B in FIG. 5, is within a positive value wherein the cross point between the kingpin axis KL and the ground lies inside of the cross point between the centerline CL of the front wheel W and the ground in relation to the transverse direction of the vehicle. The kingpin offset $\delta$ is minimized when the front wheel W is in the neutral position. When the front wheel W is turned to the inward direction or outward direction from the neutral position, the kingpin offset $\delta$ increases substantially along a quadratic curve.

In the aforementioned embodiments, the upper arm 2 comprises the two link members 6 and 7. The present invention is also effective when the lower arm 3 comprises two link members. In this case, the longitudinally disposed link member should be on the side of the cross point which is opposite to the side thereof in the aforementioned embodiments.

We claim:

1. A suspension system for a vehicle, having a front and a rear, comprising:
    a steering knuckle for supporting a wheel which is used for steering;
    two link members for connecting an upper portion of the steering knuckle to a frame of the vehicle, one of said two link members extending along a first axis, the other of said two link members extending along a second axis, the other of said two link members being disposed such that said second axis crosses said first axis at a first cross point; and
    a lower arm for connecting a lower portion of the steering knuckle to a frame of the vehicle, said lower arm having at least one inner end connected to the frame of the vehicle and an outer end connected to said steering knuckle, each of said link members also being pivotally connected to the frame of the vehicle at one end thereof and to the steering knuckle at an opposite end thereof, a kingpin axis being defined by a line extending between said first cross point and the outer end of said lower arm, said link members being so disposed as to set a kingpin offset, defined by a distance from a second cross point between the kingpin axis and the ground and a center of a contact surface between the wheel and the ground, at a positive value when said second cross point is located inside of said center of said contact surface in relation to a transverse direction of the vehicle, and increase the kingpin offset as the wheel is turned toward an outward direction wherein the wheel is located radially outwardly in relation to a turning circle, wherein the one of the two link members is disposed in the transverse direction of the vehicle and the other of the two link members is disposed in a longitudinal direction of the vehicle, the two link members being disposed such that, in a neutral position of the wheel, a connection point between the other of the two link members and the steering knuckle is located on the first axis of the one of the two link members in a plan view of the link members, and the other of the two link members extends towards the rear of the vehicle beyond the one of the two link members.

2. A suspension system for a vehicle, having a front and a rear, comprising:
    a steering knuckle for supporting a wheel which is used for steering;
    two link members for connecting an upper portion of the steering knuckle to a frame of the vehicle, one of said two link members extending along a first axis, the other of said two link members extending along a second axis, the other of said two link members being disposed such that said second axis crosses said first axis at a first cross point; ad
    a lower arm for connecting a lower portion of the steering knuckle to a frame of the vehicle, said lower arm having at least one inner end connected to the frame of the vehicle and an outer end connected to said steering knuckle, each of said link members also being pivotally connected to the frame of the vehicle at one end thereof and to the steering knuckle at an opposite end thereof, a kingpin axis being defined by a line extending between said first cross point and the outer end of said lower arm, said link members being so disposed as to set a kingpin offset, defined by a distance from a second cross point between the kingpin axis and the ground and a center of a contact surface between the wheel and the ground, at a positive value when said second cross point is located inside of said center of said contact surface in relation to a transverse direction of the vehicle, and increase the kingpin offset as the wheel is turned toward an inward direction wherein the wheel is located radially inwardly in relation to a turning circle as well as an outward direction wherein the wheel is located radially outwardly in relation to the turning circle, wherein the one of the two link members is disposed in the transverse direction of the vehicle and the other of the two link members is disposed in a longitudinal direction of the vehicle, the two link members being disposed such that, in a neutral position of the wheel, a connection point between the other of the two link members and the steering knuckle is located on the first axis of the one of the two link members in a plan view of the link members, and the other of the two link members extends towards the rear of the vehicle beyond the one of the two link members.

3. A suspension system for a vehicle, having a front and a rear, comprising:
    a steering knuckle for supporting a wheel which is sued for steering;
    two link members for connecting an upper portion of the steering knuckle to a frame of the vehicle, one of said two link members extending along a first axis, the other of said two link members extending along a second axis;
    a first joint on each of said link members pivotally connecting one end of each of said link members to a frame of the vehicle;
    a second joint on each of said link members pivotally connecting an opposite end of each of said link members to the steering knuckle, the one of said two link members being disposed such that a portion of said first axis extending beyond the second joint of the one of said two link members crosses said second axis at a first cross point;

a lower arm for connecting a lower portion of the steering knuckle to a frame of the vehicle, said lower arm having at least one inner end connected to the frame of the vehicle and an outer end connected to said steering knuckle, a kingpin axis being defined by a line extending between said first cross point and the outer end of said lower arm, said link members being so disposed as to set a kingpin offset, defined by a distance form a second cross point between the kingpin axis and the ground and a center of a contact surface between the wheel and the ground, at a positive value when said second cross point is located inside of said enter of said contact surface in relation to a transverse direction of the vehicle, and increase the kingpin offset as the wheel is turned toward an outward direction, wherein the one of the two link members is disposed in a transverse direction of the vehicle and the other of the two link members is disposed in a longitudinal direction of the vehicle, the two link embers are disposed such that, in a neutral position of the wheel, the second joint of the other of the two link members is located closer to the rear of the vehicle than the first axis of the one of the tow link members in a plan view of the link members, and a major portion of the other of the two link members extends towards the front of the vehicle beyond the first cross point in said longitudinal direction.

\* \* \* \* \*